(12) United States Patent
Une et al.

(10) Patent No.: US 8,368,979 B2
(45) Date of Patent: Feb. 5, 2013

(54) IMAGE FORMING APPARATUS AND COMPUTER READABLE MEDIUM FOR FORMING IMAGE

(75) Inventors: Kiyoshi Une, Saitama (JP); Takaya Nagasaki, Saitama (JP); Hiroyuki Kawai, Tokyo (JP); Yasuo Komatsu, Saitama (JP); Seiji Shiraki, Saitama (JP); Takumi Nishikata, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 600 days.

(21) Appl. No.: 12/542,264

(22) Filed: Aug. 17, 2009

(65) Prior Publication Data

US 2010/0182617 A1 Jul. 22, 2010

(30) Foreign Application Priority Data

Jan. 21, 2009 (JP) ................................ P2009-010907

(51) Int. Cl.
*H04N 1/40* (2006.01)
*H04N 1/46* (2006.01)
*G03F 3/08* (2006.01)

(52) U.S. Cl. ...... 358/522; 358/3.01; 358/3.02; 358/3.03; 358/3.04; 358/3.05; 358/3.23; 358/504; 358/518; 358/523

(58) Field of Classification Search .................. 358/504, 358/518, 522, 523, 3.23, 3.01–3.05
See application file for complete search history.

(56) References Cited

U.S. PATENT DOCUMENTS

| | | | |
|---|---|---|---|
| 6,346,994 B1 * | 2/2002 | Inoue | 358/1.9 |
| 7,113,639 B2 * | 9/2006 | Fukawa et al. | 382/168 |
| 7,548,357 B2 * | 6/2009 | Moriya | 358/520 |
| 8,027,062 B2 * | 9/2011 | Fujita | 358/1.9 |
| 2009/0180688 A1 * | 7/2009 | Sumi | 382/167 |

FOREIGN PATENT DOCUMENTS

| | | |
|---|---|---|
| JP | A-2000-301810 | 10/2000 |
| JP | B2-3539575 | 7/2004 |
| JP | A-2005-205723 | 8/2005 |
| JP | A-2007-88912 | 4/2007 |

OTHER PUBLICATIONS

Notification of Reason for Refusal dated Oct. 28, 2010 in corresponding Japanese Patent Application No. 2009-010907 (with translation).

* cited by examiner

*Primary Examiner* — Twyler Haskins
*Assistant Examiner* — Jonathan Beckley
(74) *Attorney, Agent, or Firm* — Oliff & Berridge, PLC

(57) ABSTRACT

An image forming apparatus includes a tone correction storage unit that stores a plurality of tone correction charts for correcting tone of image data; a determination unit that determines characteristics of the image data; a selection unit that selects a tone correction chart suitable for the image data from the plurality of tone correction charts stored in the tone correction storage unit; a chart print unit that prints the tone correction chart selected by the selection unit on a sheet; a receiving unit that receives an adjustment value inputted based on the tone correction chart printed by the chart print unit; a tone correction unit that corrects tone of the image data based the adjustment value; and a print unit that prints out the image data after correcting tone of the image data.

5 Claims, 13 Drawing Sheets

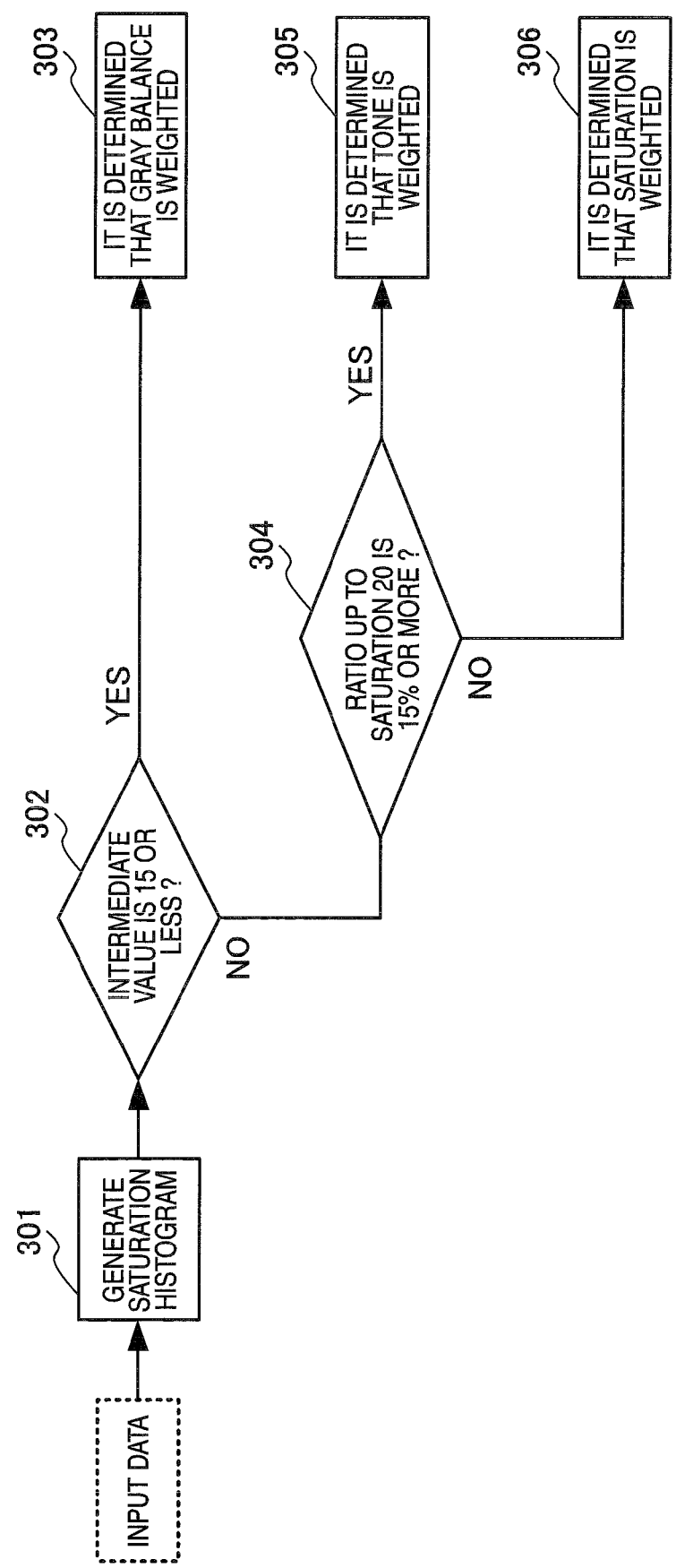

FIG. 4A
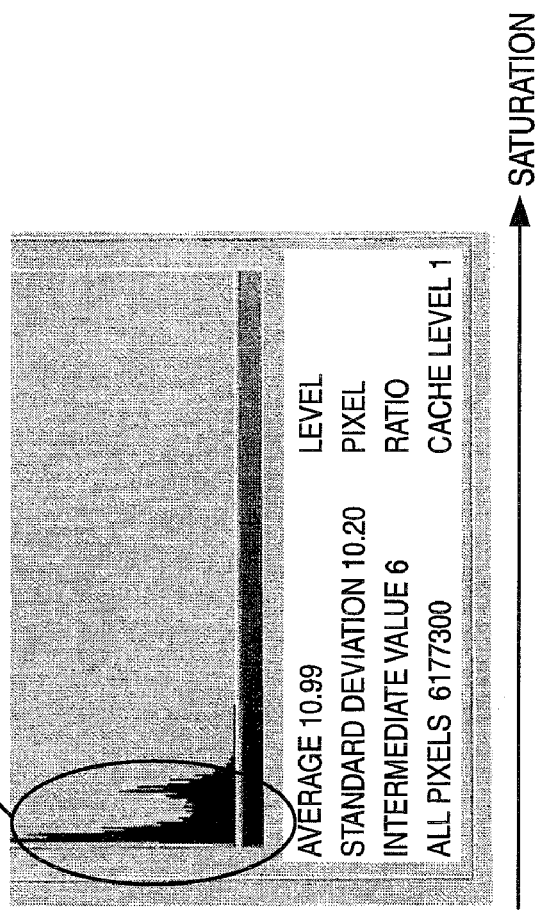

FIG. 4B
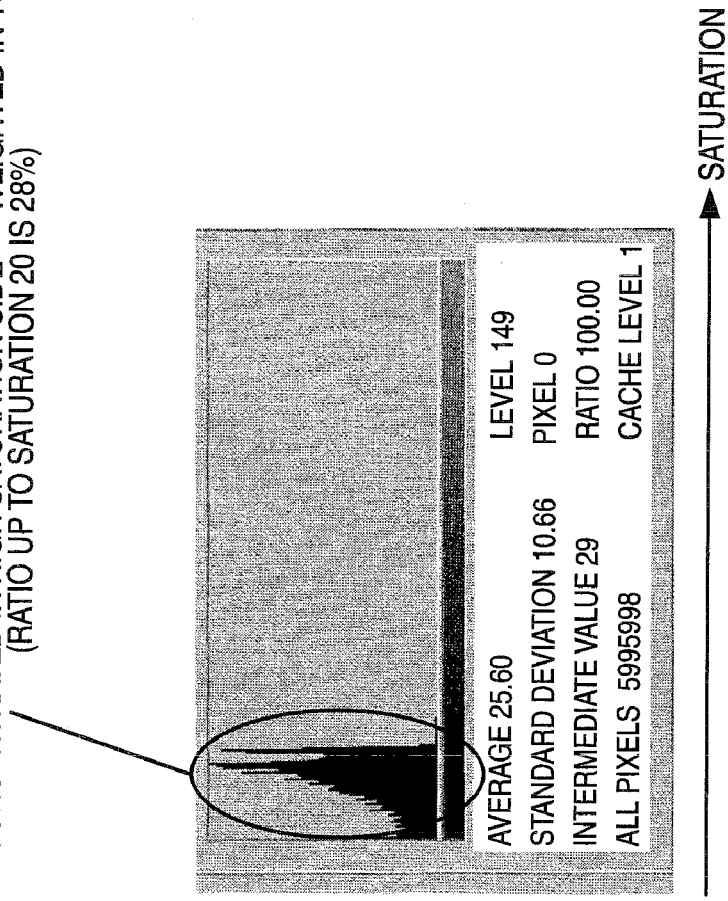
DISTRIBUTED IN AREA FROM LOW SATURATION TO SATURATION 30 AND CONCENTRATED IN HIGH SATURATION SIDE → WEIGHTED IN TONE (RATIO UP TO SATURATION 20 IS 28%)
SATURATION →
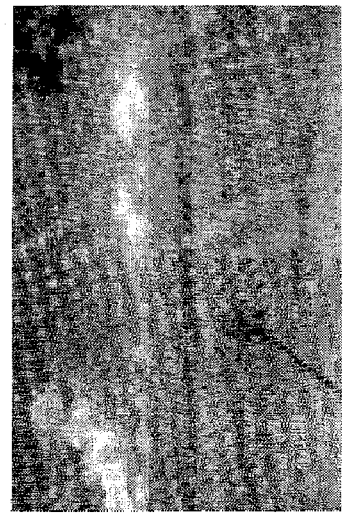

FIG. 4C
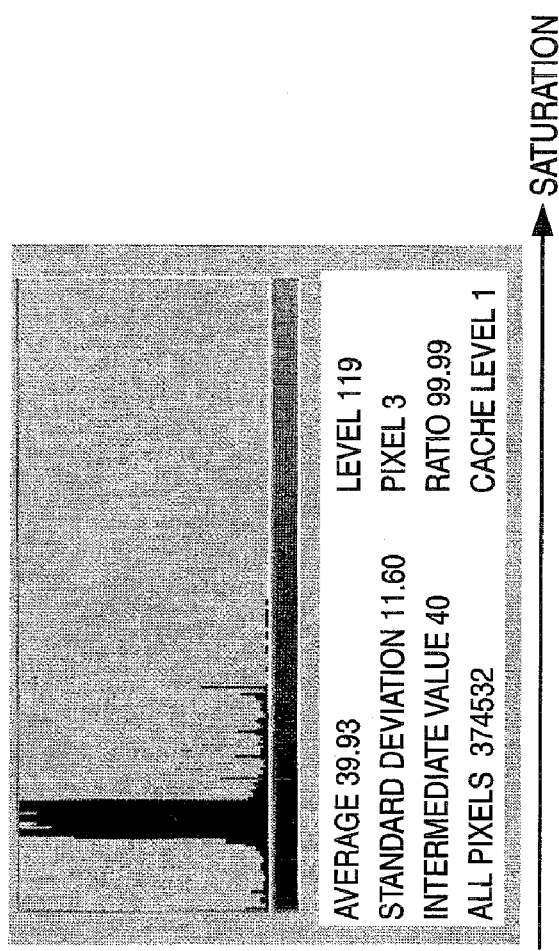
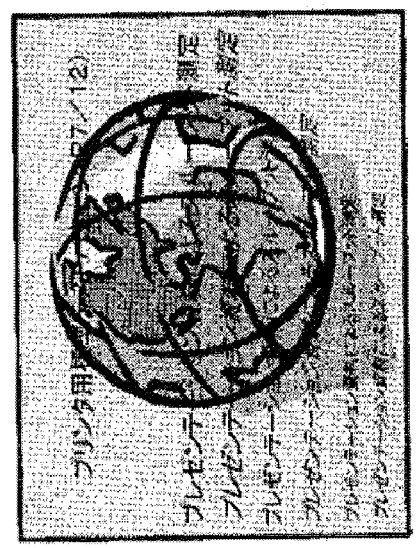

THREE STAGES OF 25%, 50% AND 75%
GRAY BALANCE GRADATION TYPE

THREE STAGES OF 25%, 50% AND 75% FOR EACH OF CMYK

TONE OF ONLY 75% FOR EACH OF CMYK

SINGLE TONE SET

ONLY TONE OF 75%
WEIGHTED IN HIGH SATURATION (FOR GRAPHIC)

SINGLE TONE SET

ONLY TONE OF 50%

SINGLE TONE SET

SINGLE TONE SET

IMAGE FORMING APPARATUS AND COMPUTER READABLE MEDIUM FOR FORMING IMAGE

CROSS-REFERENCE TO RELATED APPLICATION

This application is based on and claims priority under 35 USC 119 from Japanese Patent Application No. 2009-010907 filed on Jan. 21, 2009.

BACKGROUND

1. Technical Field

The present invention relates to an image forming apparatus and an image forming program.

2. Related Art

In an image forming apparatus such as a printer or a copying machine, since the constituent parts thereof deteriorates with age, an image is printed out with image quality different from intended image quality and hence a calibration processing is required for correcting the outputted image.

In a gray balance correction or a tone correction as the calibration, a chart constituted by various kinds of colors is printed, and the correction is performed by comparing the chart thus printed with a reference chart printed in advance or visually observing or detecting the chart by a measuring device.

In particular, as to a method of printing in a juxtaposed manner the reference pattern and a tone pattern formed by changing colors and densities and determining and correcting the densities of the tone pattern by visually observing these patterns, since it is not necessary to use the measuring device and the reference pattern and hence the apparatus can be configured at a low cost, various kinds of such the method are proposed.

SUMMARY

According to an aspect of the invention, an image forming apparatus includes a tone correction storage unit that stores a plurality of tone correction charts for correcting tone of image data; a determination unit that determines characteristics of the image data to be printed; a selection unit that selects a tone correction chart suitable for the image data from the plurality of tone correction charts stored in the tone correction storage unit based on the determination result of the determination unit; a chart print unit that prints the tone correction chart selected by the selection unit on a sheet; a receiving unit that receives an adjustment value inputted based on the tone correction chart printed by the chart print unit; a tone correction unit that corrects tone of the image data based the adjustment value received by the receiving unit; and a print unit that prints out the image data after correcting tone of the image data.

BRIEF DESCRIPTION OF THE DRAWINGS

Exemplary embodiments of the invention will be described in detail based on the following figures, wherein:

FIG. 3 is a flowchart showing the determination processing performed by a tone correction principle determination portion;

FIGS. 4A-4C are schematic diagrams showing image data and the saturation histograms thereof;

DETAILED DESCRIPTION

Hereinafter, an exemplary embodiment of the invention will be explained in detail with reference to drawings.

First Exemplary Embodiment

Figure 1:
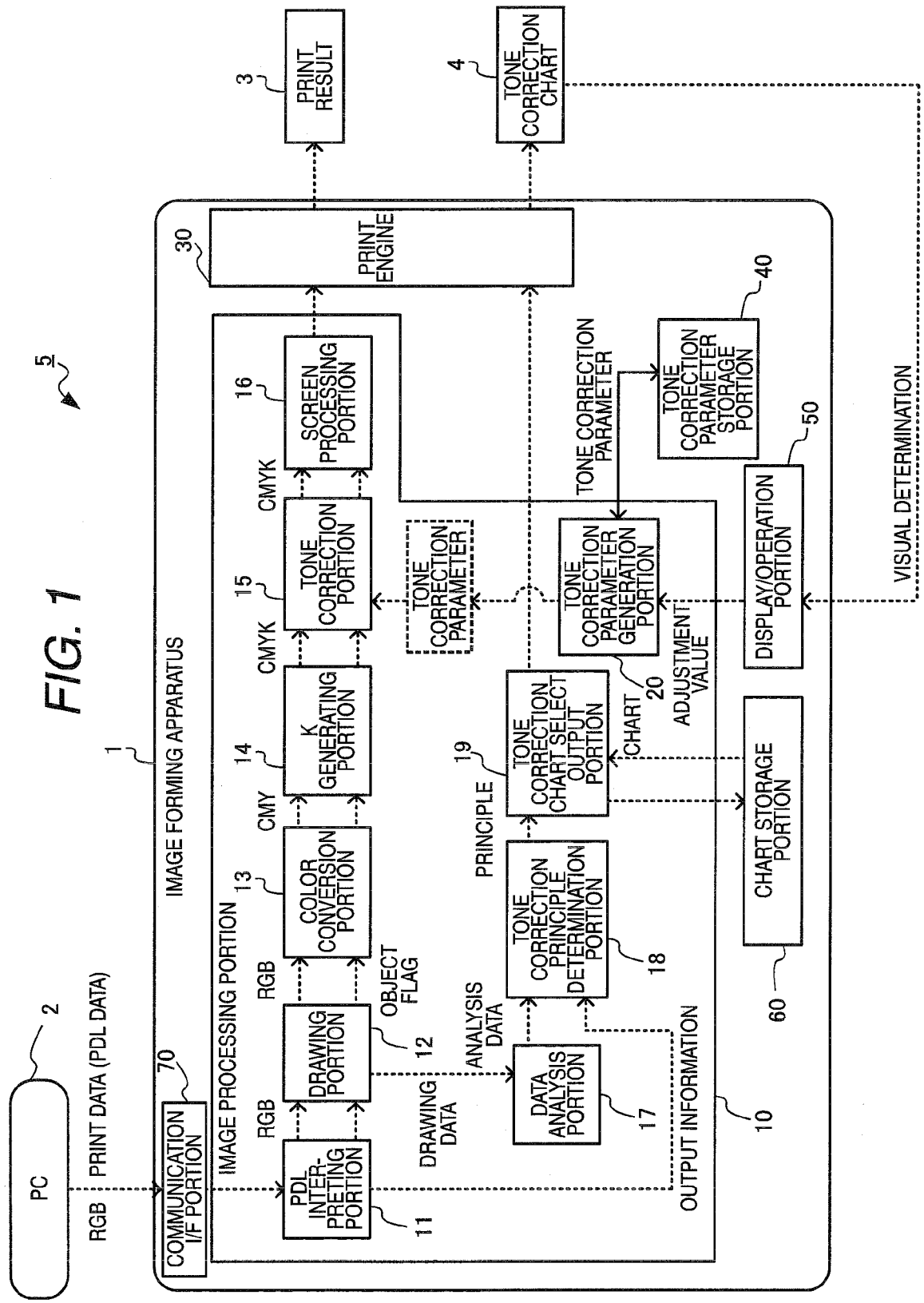
FIG. 1 is a schematic diagram showing the configuration of a print system.

First, a print system 5 will be explained with reference to FIG. 1.

In the print system 5, an image forming apparatus 1 is coupled to a personal computer 2 (hereinafter referred to PC 2) so as to be able to communicate to each other.

The image forming apparatus 1 includes an image processing portion 10, a print engine 30, a tone correction parameter storage portion 40, a display/operation portion 50, a chart storage portion 60 and a communication interface portion hereinafter referred to communication I/F portion) 70.

The image processing portion 10 generates image data for printing print job transmitted from the PC 2.

The image processing portion 10 includes a PDL (Page Description Language) interpreting portion 11, a drawing portion 12, a color conversion portion 13, a K (black) generating portion 14, a tone correction portion 15, a screen processing portion 16, a data analysis portion 17, a tone correction principle determination portion 18, a tone correction chart select output portion 19 and a tone correction parameter generation portion 20.

The PDL interpreting portion 11 interprets the PDL described in the print job received from the PC 2.

The drawing portion 12 generates the image data to be printed based on the PDL interpreted by the PDL interpreting portion 11.

The color conversion portion 13 generates CMY data based on RGB (Red, Green, Blue) data sent from the PDL interpreting portion 11 and sends the CMY data to the K generating portion.

The K generating portion 14 generates K data based on data sent from the color conversion portion 13.

The tone correction portion 15 subjects the image data of CMYK sent from the K generating portion 14 to a tone correction by using a LUT (Look Up Table) sent from the tone correction parameter generation portion 20.

The screen processing portion 16 subjects the image data processed by the tone correction portion 15 to a half tone processing.

The data analysis portion 17 generates saturation histogram of the image data generated from the drawing portion 12.

The tone correction principle determination portion 18 selects a tone correction principle optimum to the characteristics of a print job based on the output information (color or monochrome print instruction contents etc.) of the print job sent from the PDL interpreting portion 11 and the information of the saturation histogram sent from the data analysis portion 17 and instructs the tone correction principle thus selected to the tone correction chart select output portion 19.

The tone correction chart select output portion 19 selects a tone correction chart stored in the chart storage portion 60 based on the tone correction principle sent from the tone correction principle determination portion 18 to thereby print out the selected chart by the print engine 30.

The tone correction parameter generation portion 20 receives from the display/operation portion 50 an adjustment value inputted by a user based on the tone correction chart 4 printed out in accordance with the instruction from the tone correction chart select output portion 19 and generates a tone correction parameter based on the adjustment value.

The tone correction chart 4 is a sheet on which the tone correction chart is printed.

The tone correction parameter generated by the tone correction parameter generation portion 20 is stored in the tone correction parameter storage portion 40.

Further, the tone correction parameter generated by the tone correction parameter generation portion 20 is sent to the tone correction portion 15 and used for the tone correction of the image data.

The engine 40 is configured by a sheet tray for housing sheets therein, an exposure device for forming a photoreceptor from the electrostatic latent image of the image data, a developing device for forming a toner image on the photoreceptor, a transfer device for transferring the toner image to the sheet, a fixing device for fixing the toner image on the sheet, etc., thereby to perform a function of printing the image data on the sheet and outputting the sheet.

The tone correction parameter storage portion 40 is configured by an NVRAM (Non Volatile Random Access Memory) and stores the tone correction parameter generated by the tone correction parameter generation portion 20.

The display/operation portion 50 is a user interface configured by a touch panel of liquid crystal and receives the adjustment value inputted by a user based on the tone correction chart 4.

The chart storage portion 60 is configured by an ROM (Read Only Memory) and stores various kinds of tone correction charts.

Further, the ROM constituting the chart storage portion 60 stores a firmware for operating the image forming apparatus 1.

The chart storage portion 60 stores, as the tone correction charts, tone correction charts of single color provided for each density of high (density of 75%), middle (density of 50%) and low (density of 25%) for each of C (cyan), M (magenta), Y (yellow) and K (black) and also the tone correction charts for the gray balance correction provided for each density of high (density of 75%), middle (density of 50%) and low (density of 25%).

According to the image forming apparatus 1 thus configured, before printing the received print job, the tone correction chart 4 is once printed out, then the adjustment value based on the visual confirmation of the tone correction chart 4 is inputted by a user, and the tone correction is executed.

Then, after the tone correction suitable for the received print job is executed, the print job is printed out.

The tone correction chart 4 printed out by the image forming apparatus 1 is a sheet on which the tone correction chart selected as being suitable for the image data based on the image data of the print job received by the image forming apparatus 1 is printed.

Next, the explanation will be made with reference to FIG. 2 as to the processing where the tone correction is performed based on the tone correction chart 4 thus printed out from the image forming apparatus 1 and then the print job is printed out.

Figure 2:
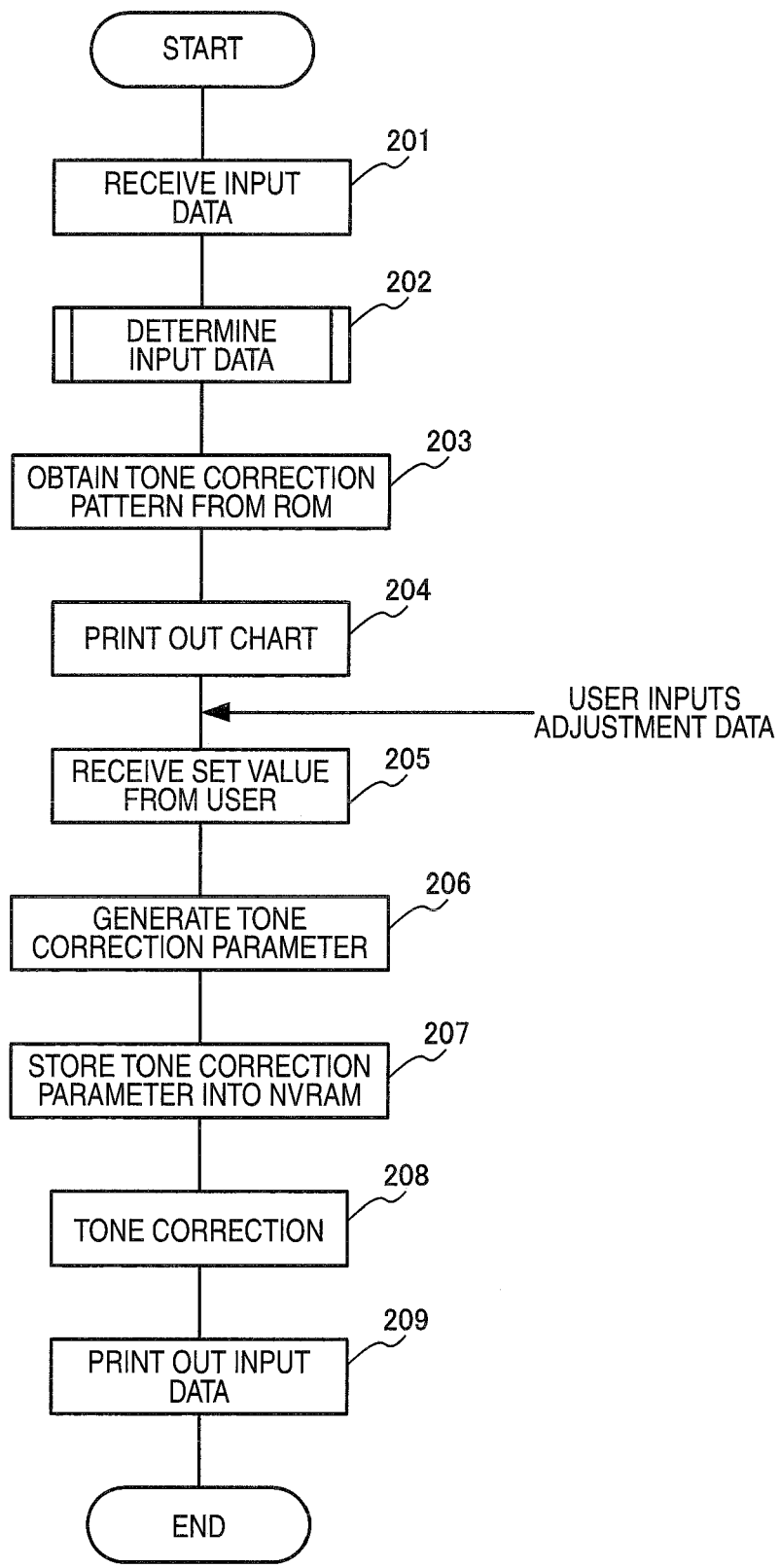
FIG. 2 is a flowchart showing the processing of an image forming apparatus.

FIG. 2 is a flowchart showing the processing where the tone correction is performed based on the tone correction chart 4 printed out from the image forming apparatus 1 and then the print job is printed out.

When the image forming apparatus 1 receives the print job at the portion 70, the PDL interpreting portion 11 reads the PDL of the print job thus received and the RGB image data of the print job is sent to the data analysis portion 17.

When the data analysis portion 17 receives the RGB image data of the print job (step 201), the data analysis portion converts the image data into the HSV (Hue, Saturation, Value) space from the RGB.

Then, the data analysis portion 17 generates the saturation histogram of the HSV image data and sends the histogram thus generated to the tone correction principle determination portion 18.

The tone correction principle determination portion 18 determines the image data of the print job based on the saturation histogram sent from the data analysis portion 17 (step 202).

The explanation will be made as to the determination processing performed by the tone correction principle determination portion 18 with reference to FIG. 3.

FIG. 3 is a flowchart showing the determination processing of the image data of the print job performed by the image processing portion 10.

When the saturation histogram is generated by the data analysis portion 17 (step 301), the saturation histogram is sent to the tone correction principle determination portion 18. Then, the tone correction principle determination portion 18 determines whether or not the intermediate value of the image data is 15 or less (step 302). The determination as to whether or not the intermediate value of the image data is 15 or less is performed in order to confirm the ratio of the gray within the image data. When it is determined in step 302 that the intermediate value is 15 or less (yes in step 302), it is determined that the image data of the print job is weighted in the gray balance (step 303).

In contrast, when it is determined in step 302 that the intermediate value is more than 15 (no in step 302), the tone correction principle determination portion 18 determines whether or not the ratio up to the saturation 20 is 15% or more (step 304).

When the tone correction principle determination portion 18 determines that the ratio up to the saturation 20 of the saturation histogram of the image data of the print job is 15% or more (yes in step 304), it is determined that the image data of the print job is weighted in the tone (step 305).

In contrast, when the tone correction principle determination portion 18 determines that the ratio up to the saturation 20 of the saturation histogram of the image data of the print job is less than 15% (no in step 304), it is determined that the image data of the print job is weighted in the saturation (step 306).

The explanation will be made with reference to FIG. 4 as to the image data of ht print job determined as being weighted in the gray balance, the image data of ht print job determined as being weighted in the tone, and the image data of the print job determined as being weighted in the saturation.

FIG. 4 is schematic diagrams showing the image data of the print jobs which tone correction principles are determined by the tone correction principle determination portion 18 and the saturation histograms thereof, wherein FIG. 4A shows the image data of the print job determined as being weighted in the gray balance, FIG. 4B shows the image data of the print job determined as being weighted in the tone, and FIG. 4C shows the image data of the print job determined as being weighted in the saturation.

As shown in FIG. 4A, the image data of the print job which tone correction principle is determined by the tone correction principle determination portion 18 as being weighted in the gray balance is a picture of a person wearing a black cloth and the saturation histogram thereof is concentrated in a low saturation area.

As shown in FIG. 4B, the image data of the print job which tone correction principle is determined by the tone correction principle determination portion 18 as being weighted in the tone is a picture of a landscape and the saturation histogram thereof is distributed in an area from the low saturation to the saturation 30 and concentrated in a high saturation side.

Further, as shown in FIG. 4C, the image data of the print job which tone correction principle is determined by the tone correction principle determination portion 18 as being weighted in the saturation is a screen for presentation and the saturation histogram thereof is concentrated near the saturation 35. When the tone correction principle determination portion 18 performs the determination of the image data of the print job (step 202), the tone correction chart select output portion 19 receives the tone correction principle determined by the tone correction principle determination portion 18 and selects and obtains the tone correction chart stored in the chart storage portion 60 based on the tone correction principle (step 203).

Then, the tone correction chart select output portion 19 applies the tone correction chart obtained from the chart storage portion 60 to the print engine 30 to thereby pint out the chart (step 204).

A user selects the adjustment value from the tone correction chart 4 based on the chat 4 thus printed out from the print engine 30 and applies the adjustment value to the display/operation portion 50.

The display/operation portion 50 receives the adjustment value inputted by a user (step 205) and sends the adjustment value to the tone correction parameter generation portion 20.

The tone correction parameter generation portion 20 generates the tone correction parameter for the tone correction based on the adjustment value thus sent (step 206).

The tone correction parameter generated by the tone correction parameter generation portion 20 is the LUT for the gray balance correction or the LUT for the tone correction of the single color which is generated based on the tone correction chart selected by the tone correction chart select output portion 19 and printed out.

The tone correction parameters thus generated by the tone correction parameter generation portion 20 are stored in the tone correction parameter storage portion 40 (step 207) and then sent to the tone correction portion 15.

Then, the data of the print job received by the portion 70 is interpreted by the PDL interpreting portion 11 and drawn by the drawing portion 12, and the CMY data is generated by the color conversion portion 13.

Then, the tone correction portion 15 subjects the CMYK image data sent form the K generating portion 14 to the tone correction based on the tone correction parameter sent from the tone correction parameter generation portion 20.

Thereafter, the image data thus subjected to the tone correction is subjected to the half tone processing by the screen processing portion 16 and printed out from the print engine 30 (step 209).

The data thus printed out represents a print result subjected to the tone correction by the adjustment value inputted based on the tone correction chart suitable for the print job.

Next, the tone correction charts printed out as the results of the determination by the tone correction principle determination portion 18 will be explained with reference to FIG. 5.

Figure 5A:
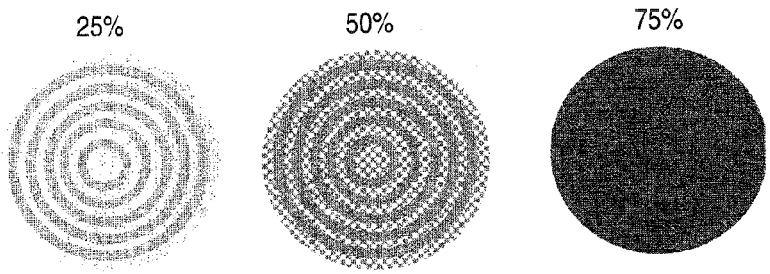
FIGS. 5A-5C are schematic diagrams showing print contents printed on tone correction charts.
Figure 5B:
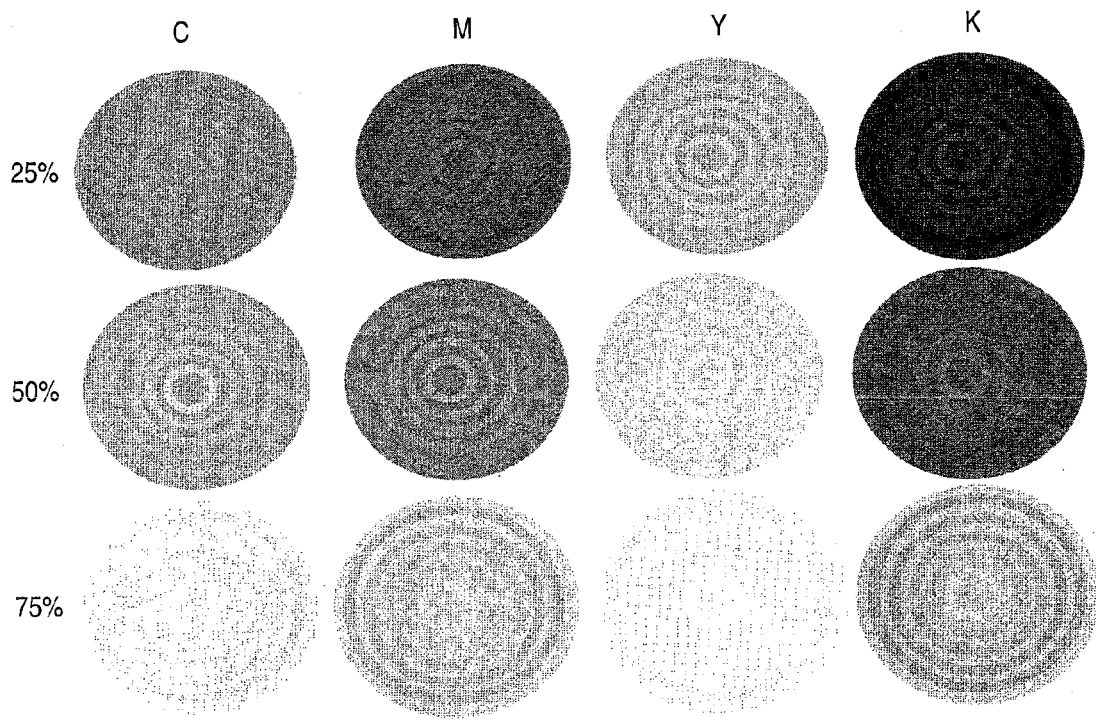
Figure 5C:
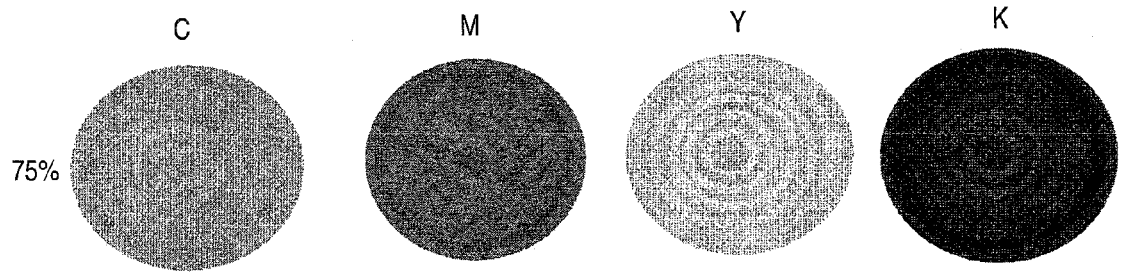

FIG. 5 is schematic diagrams showing the print contents printed as the tone correction charts by the print engine 30, wherein FIG. 5A represents the print contents of the tone correction chart 4 determined as being weighted in the gray balance by the tone correction principle determination portion 18 and printed out, FIG. 5B represents the print contents of the tone correction chart 4 determined as being weighted in the tone by the tone correction principle determination portion 18 and printed out, and FIG. 5C represents the print contents of the tone correction chart 4 determined as being weighted in the saturation by the tone correction principle determination portion 18 and printed out.

As show in FIG. 5A, the tone correction charts 4 printed out as the results of the determination by the tone correction principle determination portion 18 that the image data of the print job is weighted in the gray balance are the tone correction charts for adjusting the gray balance in the three stages of high (density of 75%), middle (density of 50%) and low (density of 25%) suitable for adjusting the gray balance. These charts represent patters where the mixing ratios of YMC are changed, wherein the gray balance is adjusted by pointing out a portion viewed as gray.

As show in FIG. 5B, the tone correction charts 4 printed out as the results of the determination by the tone correction principle determination portion 18 that the image data of the print job is weighted in the tone are the tone correction charts of single color for adjusting in the three stages of high (density of 75%), middle (density of 50%) and low (density of 25%) for each of CMYK colors. These charts are used in a manner that the tone is corrected by pointing out a portion close to the target density for each color.

As show in FIG. 5C, the tone correction charts 4 printed out as the results of the determination by the tone correction principle determination portion 18 that the image data of the print job is weighted in the saturation are the tone correction charts of single color for adjusting only as to high (density of 75%) for each of CMYK colors.

In this manner, according to the image forming apparatus 1, the chart storage portion 60 selects the tone correction chart to be printed out, based on the tone correction principle determined by the tone correction principle determination portion 18.

Second Exemplary Embodiment

The explanation will be made as to an image forming apparatus 8 which is configured by providing an adjustment accuracy determination portion 21 within the image processing portion 10 of the image forming apparatus 1 explained in the first exemplary embodiment.

In this exemplary embodiment, the explanation will be made in a manner that the constituent elements having the same reference numerals as those of the image forming apparatus 1 explained in the first exemplary embodiment have basically the same functions and same configurations as the constituent elements of the image forming apparatus 1 explained in the first exemplary embodiment, respectively.

First, a print system 6 configured by the image forming apparatus 8 will be explained with reference to FIG. 6.

Figure 6:
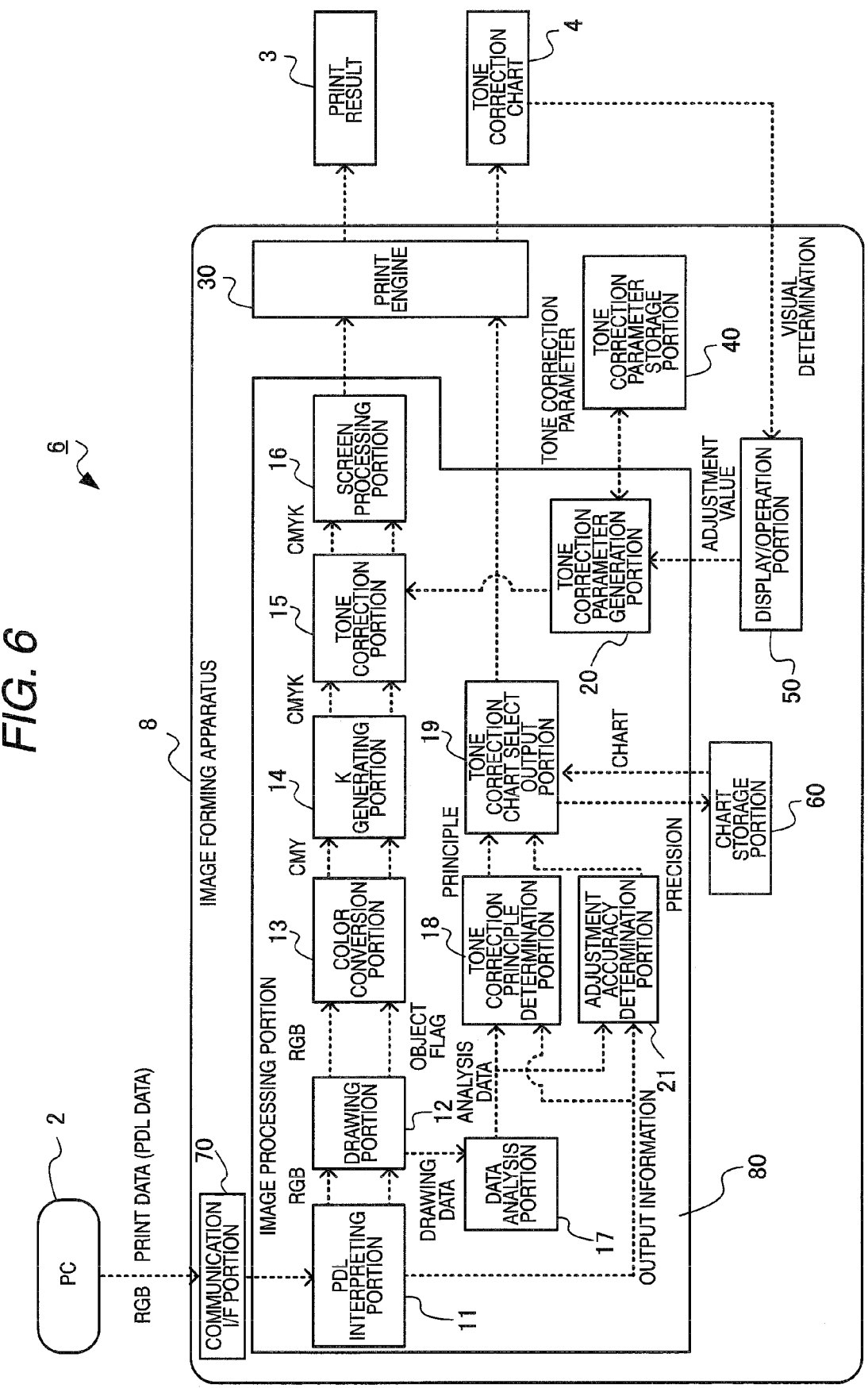
FIG. 6 is a schematic diagram showing the configuration of a print system.

As shown in FIG. 6, in the print system 6, the image forming apparatus 8 is coupled to a PC 2 so as to be able to communicate to each other.

Like the image forming apparatus 1 explained in the first exemplary embodiment, the image forming apparatus 8 includes a print engine 30, a tone correction parameter storage portion 40, a display/operation portion 50, a chart storage portion 60 and a communication I/F portion 70, and further includes an image processing portion 80 unlike the image forming apparatus 1 explained in the first exemplary embodiment.

Like the image forming apparatus 1 explained in the first exemplary embodiment, the image processing portion 80 includes a PDL (Page Description Language) interpreting portion 11, a drawing portion 12, a color conversion portion 13, a K (black) generating portion 14, a tone correction portion 15, a screen processing portion 16, a data analysis portion 17, a tone correction principle determination portion 18, a tone correction chart select output portion 19, a tone correction parameter generation portion 20, and her includes an adjustment accuracy determination portion 21.

The adjustment accuracy determination portion 21 determines whether or not the correction processing based on the tone correction chart is to be performed with a high accuracy based on the output information (color or monochrome print instruction contents, output resolution etc.) of the print job interpreted by the PDL interpreting portion 11 and the information of the saturation histogram sent from the PDL interpreting portion 11.

Unlike the first exemplary embodiment, the tone correction chart select output portion 19 receives the tone correction principle determined by the tone correction principle determination portion 18 and the adjustment accuracy determined by the adjustment accuracy determination portion 21 to thereby select the tone correction chart suitable for the tone correction principle and the adjustment accuracy thus received from the chart storage portion 60.

That is, the processings of performing the tone correction based on the tone correction chart printed out from the image forming apparatus 8 and printing the print job differs from the contents explained with reference to FIG. 2 in the first exemplary embodiment in step 203 in a manner that the tone correction chart select output portion 19 selects the tone correction chart from the chart storage portion 60 based on the tone correction principle and the adjustment accuracy (corresponding to step 203 of FIG. 2).

In the image forming apparatus 8, the processings of performing the tone correction based on the tone correction chart printed out and printing the print job are performed in the aforesaid manner similar to step 203 explained with reference to FIG. 2 in the first exemplary embodiment and the remaining processings in this exemplary embodiment are same as those explained with reference to FIG. 2 in the first exemplary embodiment Next, the explanation will be made with reference to FIG. 7 as to the tone correction chart selected by the tone correction chart select output portion 19 when the correction accuracy is high.

FIG. 7 is schematic diagrams showing the tone correction charts in the case where the tone correction charts of high accuracy are selected by the tone correction chart select output portion 19 when the adjustment accuracy determination portion 21 determines that the correction accuracy is high.

Figure 7A:
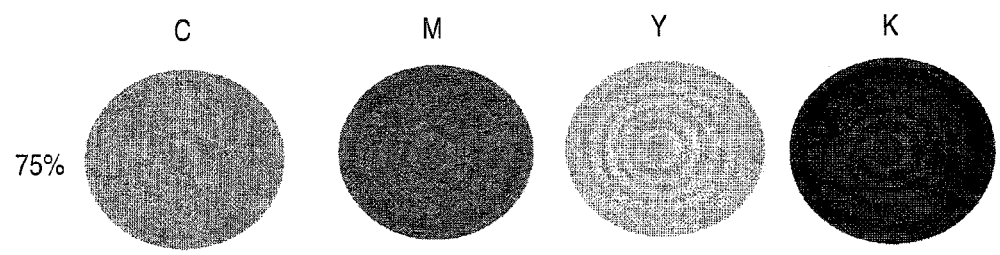
FIGS. 7A-7D are schematic diagram showing tone correction charts in a case of selecting tone correction charts of high accuracy.
Figure 7B:
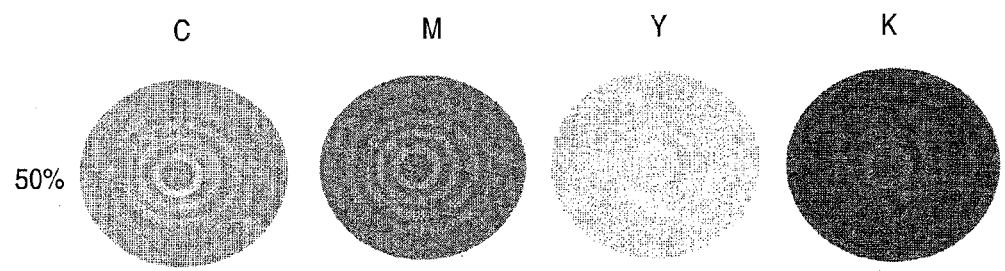
Figure 7C:
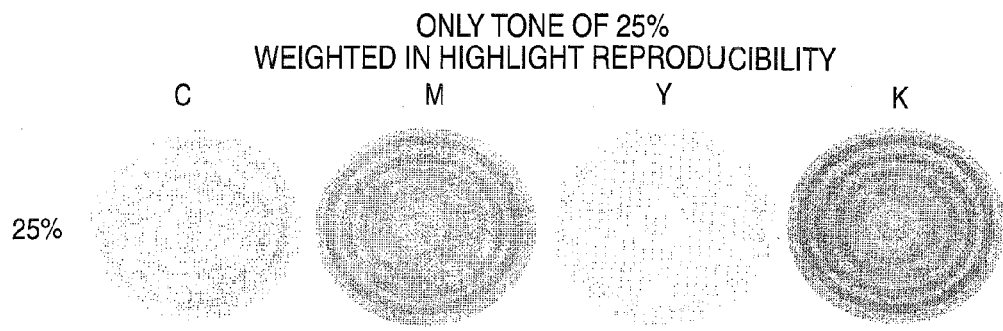

For example, FIGS. 7A, 7B and 7C respectively show the schematic diagrams of the tone correction charts of high (density of 75%), middle (density of 50%) and low (density of 25%) for each single color of CMYK. In each of these charts, the adjustment can be performed as to only particular density (one of 25%, 50% and 75%).

Figure 7D:
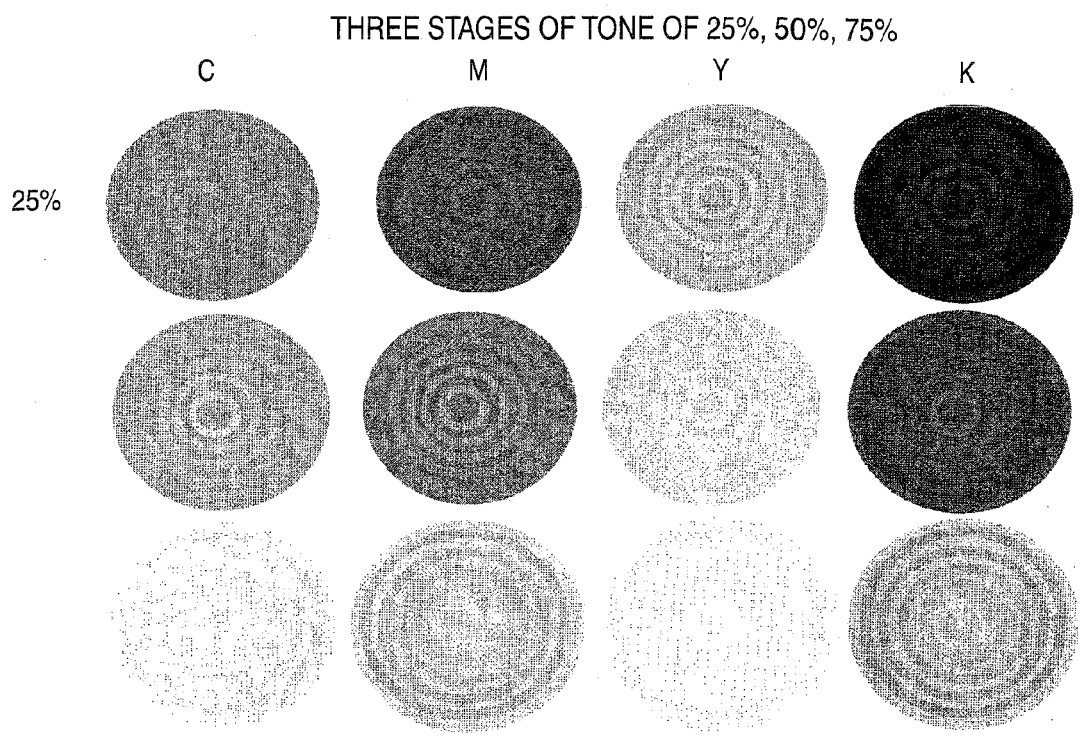

FIG. 7D is schematic diagrams showing the tone correction charts of high accuracy for each single color of CMYK. In this case, it is possible to correct the tone for each density of 25%, 50% and 75%.

For example, in the case where the tone correction chart select output portion 19 obtains the tone correction chart of single color based on the tone correction principle sent from the tone correction principle determination portion 18, the tone correction chart of high accuracy of single color of CMYK shown in FIG. 7D when information representing that the correction accuracy is to be high is sent from the adjustment accuracy determination portion 21.

In contrast, when information representing that only particular tone is to be corrected is received, for example, when information representing that only high density is to be corrected is received, the chart of the single color shown in FIG. 7D is obtained (similar to the case 7C of the first exemplary embodiment).

In this manner, according to the second exemplary embodiment, the chart storage portion 60 stores the tone correction chart of high accuracy for each tone correction chart selected by the tone correction chart select output portion 19.

Third Exemplary Embodiment

The explanation will be made as to an image forming apparatus 9 which is configured by providing a tone correction history holding portion 41 within the image forming apparatus 8 explained in the second exemplary embodiment.

In this exemplary embodiment, the constituent elements having the same reference numerals as those of the apparatuses 1 and 8 explained in the first and second exemplary embodiments have basically the same functions and same configurations as the constituent elements of the apparatuses 1 and 8 explained in the first and second exemplary embodiments, respectively.

First, a print system 7 configured by the image forming apparatus 9 will be explained with reference to FIG. 8.

Figure 8:
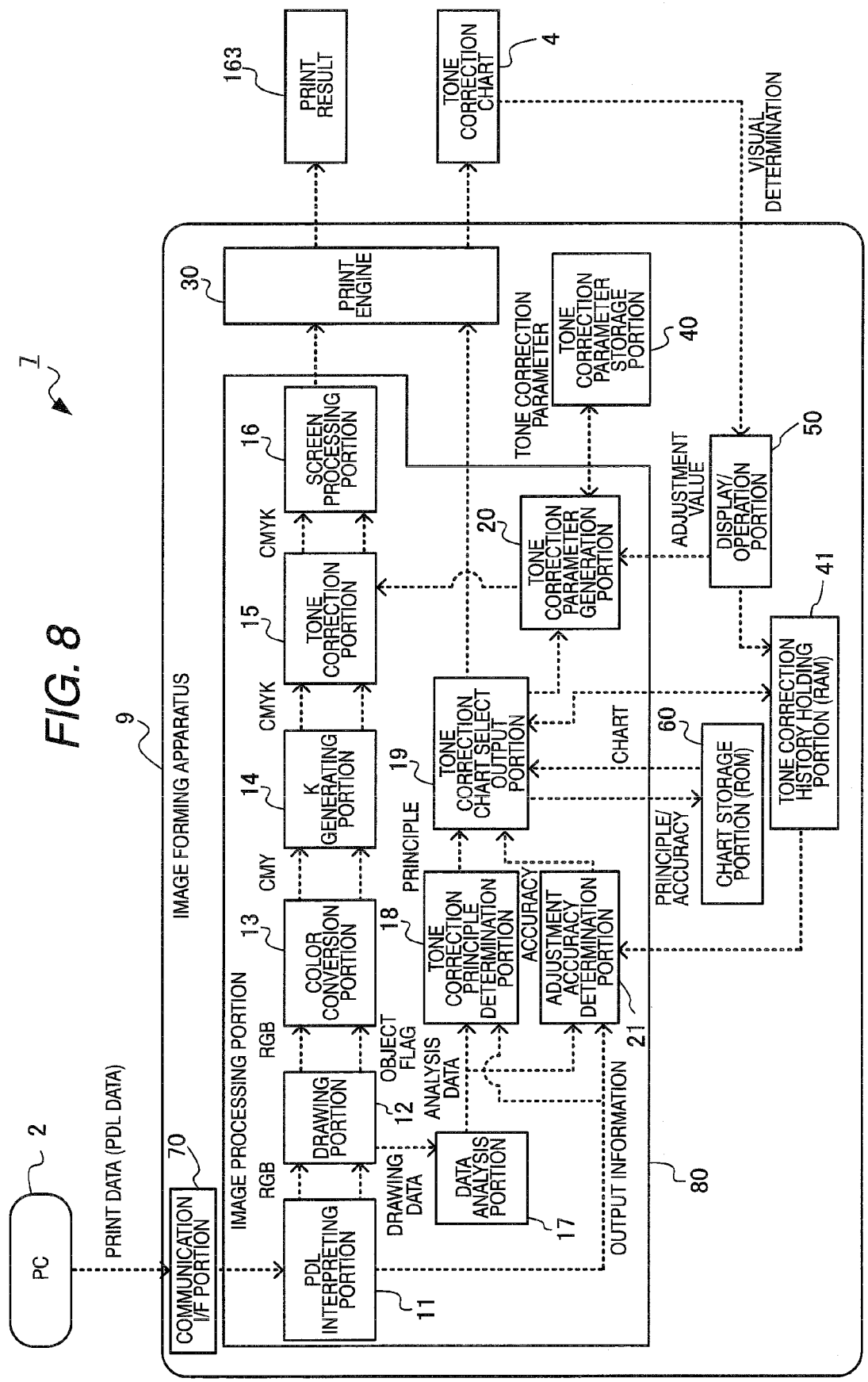
FIG. 8 is a schematic diagram showing the configuration of a print system.

As shown in FIG. 8, in the print system 7, the image forming apparatus 9 is coupled to a PC 2 so as to be able to communicate to each other.

Like the image forming apparatus 8 explained in the second exemplary embodiment, the image forming apparatus 9 includes a print engine 30, a tone correction parameter storage portion 40, a display/operation portion 50, a chart storage portion 60 and a communication I/F portion 70, and further includes a tone correction history holding portion 41 unlike the image forming apparatus 8 explained in the second exemplary embodiment.

The tone correction history holding portion 41 is configured by an NVRAM and stores the history of the tone correction charts selected by the tone correction chart select output portion 19 and printed out and the history of the adjustment values inputted into the display/operation portion 50 based on the printed tone correction charts 4.

Further, the tone correction chart select output portion 19 within the image processing portion 80 has a function of determining whether or not a tone correction chart is to be printed based on information stored in the tone correction history holding portion 41, in addition to the function explained in the first and second exemplary embodiments.

Further, the display/operation portion 50 sends information of the adjustment value inputted therein based on the printed tone correction chart 4 to the tone correction history holding portion 41.

Next, the explanation will be made with reference to FIGS. 9 and 10 as to the processings of the image forming apparatus 9 until a print job is printed out after receiving the print job.

Figure 9:
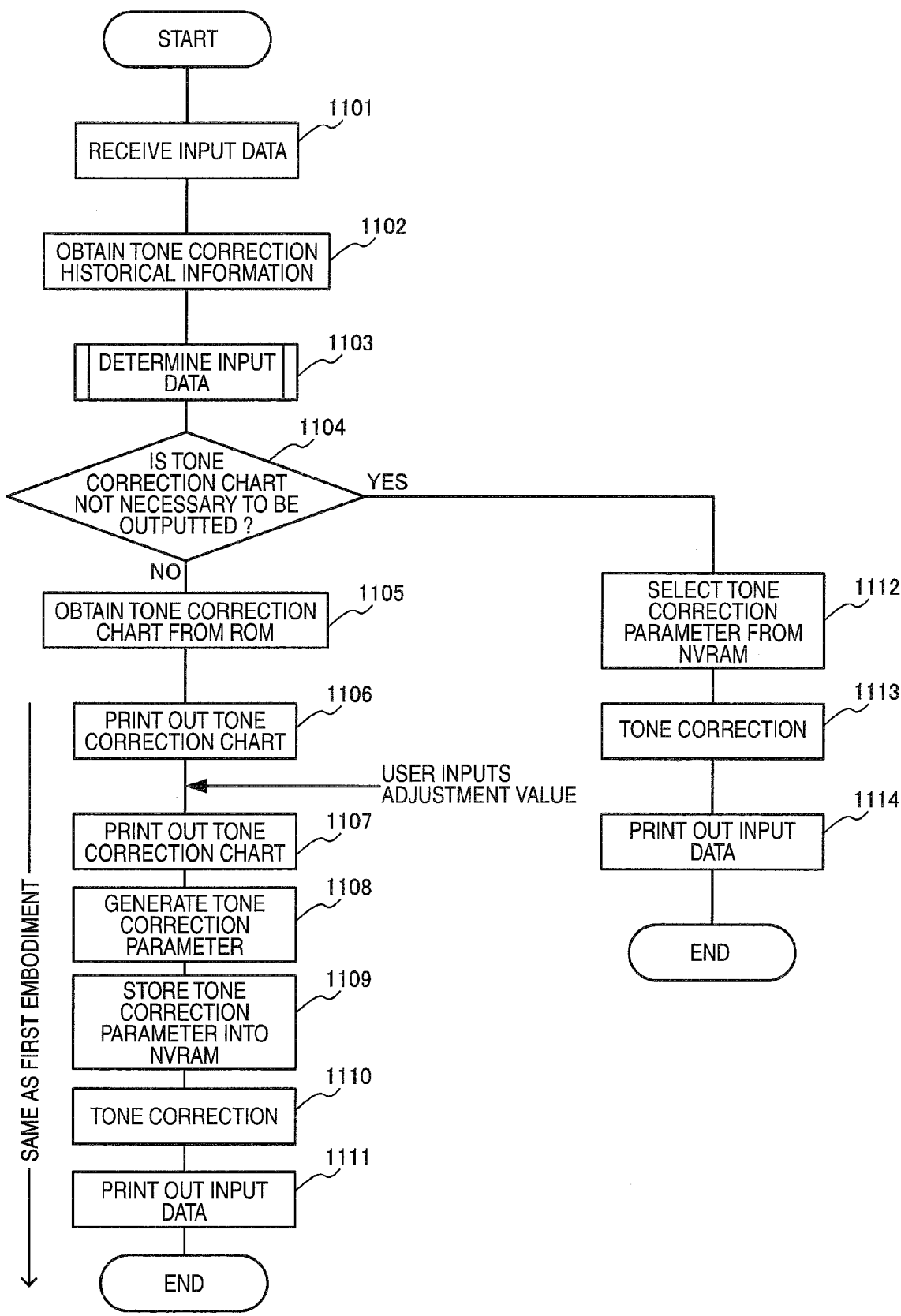
FIG. 9 is a flowchart showing the processing of an image forming apparatus.

FIG. 9 is a flowchart showing the processings performed by the image forming apparatus 9.

When the image forming apparatus 9 receives the print job at the portion 70, the PDL interpreting portion 11 reads the PDL of the print job thus received and the RGB image data of the print job is sent to the data analysis portion 17.

When the data analysis portion 17 receives the RGB image data of the print job (step 1101), the data analysis portion converts the image data into the HSV space from the RGB.

However, when the RGB image data thus received is a binary image of black and white, the image forming apparatus 9 does not print out the tone correction chart 4 but the print engine 30 outputs the image data of the print job.

In contrast, when the RGB image data thus received is not a binary image of black and white, the data analysis portion 17 generates the saturation histogram of the HSV image data and sends the histogram thus generated to the tone correction principle determination portion 18.

The tone correction principle determination portion 18 determines the image data of the print job based on the saturation histogram sent from the data analysis portion 17 (processing corresponding to step 202 of FIG. 2) and sends a tone correction principle thus determined to the tone correction chart select output portion 19.

The adjustment accuracy determination portion 21 determines whether or not the correction processing based on based on the output information (color or monochrome print instruction contents, output resolution etc.) of the print job interpreted by the PDL interpreting portion 11 and the information of the saturation histogram sent from the PDL interpreting portion 11 is to be performed with a high accuracy and sends the determination result to the tone correction chart select output portion 19.

The tone correction chart select output portion 19 receives the tone correction principle from the tone correction principle determination portion 18, the information of the adjustment accuracy from the adjustment accuracy determination portion 21 and the historical information from the tone correction history holding portion 41 (step 1102).

Then, the tone correction chart select output portion 19 performs the determination based on the inputted data (step 1103).

Next, the determination processing performed by the tone correction chart select output portion 19 will be explained with reference to FIG. 10.

Figure 10:
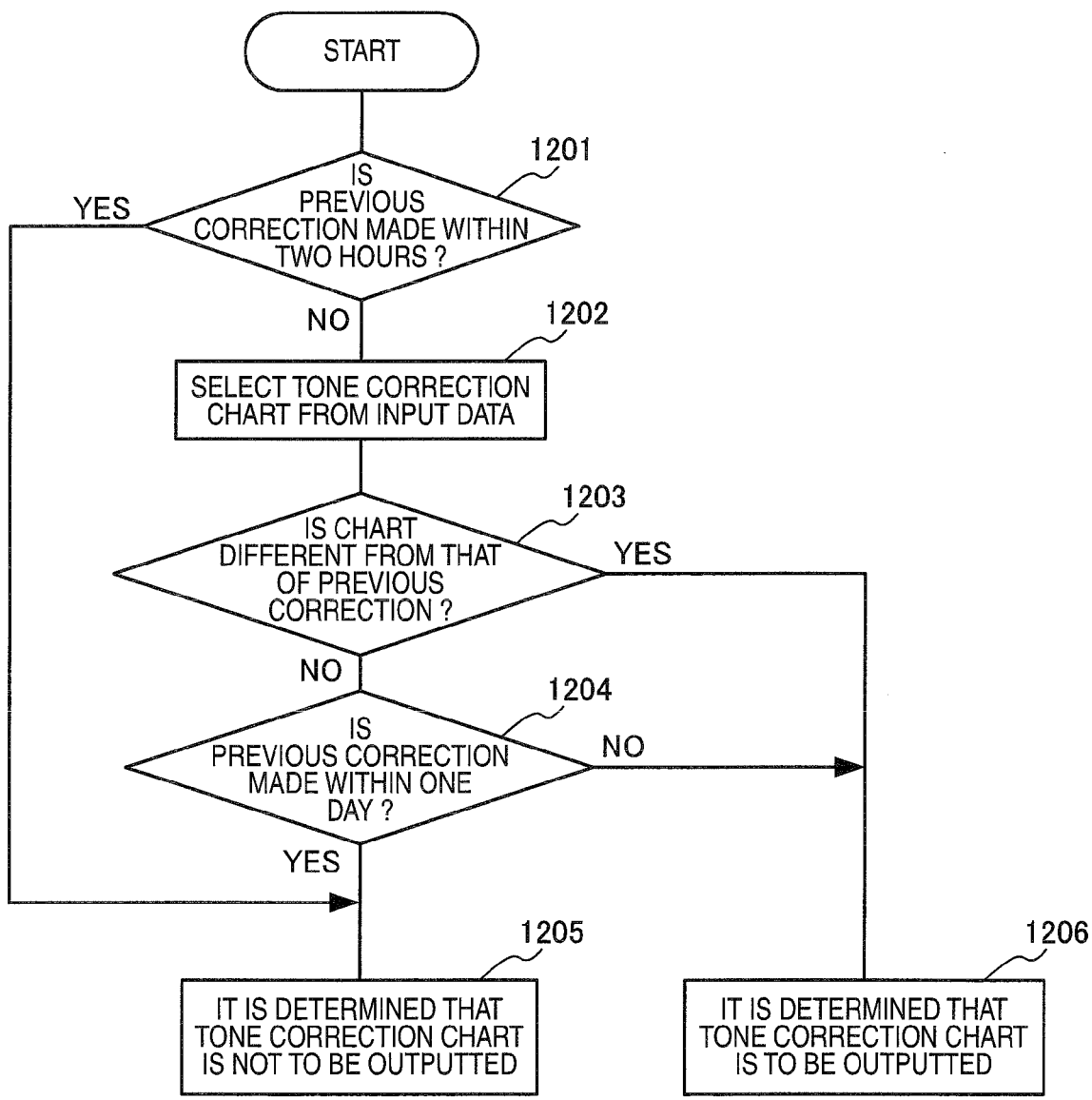
FIG. 10 is a flowchart showing the determination processing performed by a tone correction chart select output portion.

FIG. 10 is a flowchart showing the processing executed in the subroutine of step 1103 performed by the tone correction chart select output portion 19.

As shown in FIG. 10, the tone correction chart select output portion 19 determines based on the historical information obtained from the tone correction history holding portion 41 whether or not two hours has lapsed after receiving the previous adjustment value from a user after printing the tone correction chart 4 (step 1201).

When it is determined that the previous correction is made within two hours in step 1201 (yes in step 1201), it is determined that it is not necessary to print out the tone correction chart 4 from the print engine 30 (step 1205).

In contrast, when it is determined that the previous correction is made not within two hours in step 1201 (no in step 1201), the tone correction chart select output portion 19 selects from the chart storage portion 60 the image data of the tone correction chart 4 to be printed out based on the tone correction principle received from the tone correction principle determination portion 18 and the information of the adjustment accuracy received from the adjustment accuracy determination portion 21 (step 1202).

Since the processing of selecting the tone correction chart 4 by the tone correction chart select output portion 19 is same as the processing of selecting the tone correction chart from the chart storage portion 60 by the tone correction chart select output portion 19 within the image forming apparatus 8 explained in the second exemplary embodiment, the explanation thereof is omitted.

When the tone correction chart is selected from the chart storage portion 60 by the tone correction chart select output portion 19 within the image forming apparatus 9, the tone correction chart select output portion 19 determines based on the historical information obtained from the tone correction history holding portion 41 whether or not the tone correction chart selected from the chart storage portion 60 differs from the tone correction chart 4 printed out at the previous time (step 1203).

When it is determined that the selected tone correction chart is not different from the chart printed out at the previous time (no in step 1203), the tone correction chart select output portion 19 determines based on the historical information obtained from the tone correction history holding portion 41 whether or not one day has lapsed after receiving the previous adjustment value from a user after printing the tone correction chart 4 (step 1204).

When it is determined at step 1204 that one day has not lapsed yet after receiving the previous adjustment value from a user after printing the tone correction chart 4 by the tone correction chart select output portion 19 (yes in step 1204), it is determined that it is not necessary to print out the tone correction chart 4 from the print engine 30 (step 1205).

When it is determined that the selected tone correction chart is different from the chart printed out at the previous time (yes in step 1203), the tone correction chart select output portion 19 determines to print out the image data of the tone correction chart 4 selected from the chart storage portion 60 in step 1202 (step 1206).

When the determination is made as to the tone correction chart 4 to be printed out by the tone correction chart select output portion 19 within the image forming apparatus 9 (step 1206, no in step 1204), the tone correction chart select output portion 19 obtains the image data of the tone correction chart 4 to be printed out from the chart storage portion 60 (step 1105), and the print engine 30 prints out the tone correction chart 4 thus obtained (step 1106).

When the tone correction chart 4 is printed out from the print engine 30, a user selects the adjustment value based on the tone correction chart 4 thus printed out and inputs the selected value into the display/operation portion 50.

The processings after printing out the tone correction chart 4 from the print engine 30 are same as the processing of step 204 and the succeeding processings thereof explained with reference to FIG. 2 in the first exemplary embodiment. That is, the display/operation portion 50 receives the adjustment value inputted by a user (step 1107), then the tone correction parameter generation portion 20 receives adjustment value from the display/operation portion 50 and generates the tone correction parameter for the tone correction (step 1108), then the tone correction parameter thus generated is stored in the tone correction parameter storage portion 40 (step 1109) and also sent to the tone correction portion 15.

The data of the print job received by the portion 70 is interpreted by the PDL interpreting portion 11, then drawn by the drawing portion 12 and converted into the CMY data by the color conversion portion 13.

Then, the tone correction portion 15 subjects the CMYK image data sent from the K generating portion 14 to the tone correction processing based on the tone correction parameter sent from the tone correction parameter generation portion 20 (step 1110).

Then, the image data thus subjected to the tone correction is subjected to the halftone processing by the screen processing portion 16 and printed out by the print engine 30 (step 1111).

When it is determined that the tone correction chart 4 is to be printed out in the subroutine processing of step 1103 (step 1206, yes in step 1104), the tone correction parameter generation portion 20 selects the optimum tone correction parameter among the characteristics of the print job, the kind of the print job and the output mode from the tone correction parameter storage portion 40 and sends the tone correction parameter thus selected to the tone correction portion 15 (step 1112).

The data of the print job received by the portion 70 is interpreted by the PDL interpreting portion 11, then drawn by the drawing portion 12 and converted into the CMY data by the color conversion portion 13.

Then, the tone correction portion 15 subjects the CMYK image data sent from the K generating portion 14 to the tone correction processing based on the tone correction parameter sent from the tone correction parameter generation portion 20 (step 1113).

Then, the image data thus subjected to the tone correction is subjected to the halftone processing by the screen processing portion 16 and printed out by the print engine 30 (step 1114).

The processing of selecting the optimum tone correction parameter in step 1112 is, for example, a processing of selecting, based on the historical information stored in the tone correction history holding portion 41, the tone correction parameter which is generated in response to the adjustment value inputted at the time of printing out the tone correction chart which is selected by the tone correction chart select output portion 19 based on the information of the tone correction principle and the adjustment accuracy received after analyzing the print job (processing same as step 1202).

The invention can be utilized in the image forming apparatus and the image forming program.

The image forming program according to the invention can be provided via a communication unit and also provided by a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus, comprising:
   a tone correction storage unit that stores a plurality of tone correction charts for correcting tone of image data;
   a determination unit that determines characteristics of the image data to be printed based on a saturation histogram of the image data to compare information of the saturation histogram with a predetermined reference value;
   a selection unit that selects a tone correction chart suitable for the image data from the plurality of tone correction charts stored in the tone correction storage unit based on the determination result including the saturation histogram by the determination unit;
   a chart print unit that prints the tone correction chart selected by the selection unit on a sheet;
   a receiving unit that receives an adjustment value inputted based on the tone correction chart printed by the chart print unit;
   a tone correction unit that corrects tone of the image data based the adjustment value received by the receiving unit; and
   a print unit that prints out the image data after correcting tone of the image data.

2. The image forming apparatus according to claim 1, wherein the tone correction storage unit stores a first tone correction chart weighted in tone correction of single color and a second tone correction chart weighted in gray balance correction,
   the determination unit determines as to which one of the first and second tone corrections is suitable with respect to the image data, and
   the selection unit selects the determined tone correction chart by the determination unit.

3. The image forming apparatus according to claim 1, wherein
   the tone correction storage unit stores each of the plurality of tone correction charts having different correction accuracies as to the tone correction charts to be stored,
   the determination unit determines the correction accuracy suitable for the image data, and
   the selection unit selects the tone correction chart stored in the tone correction storage unit based on the correction accuracy determined by the determination unit.

4. The image forming apparatus according to claim 1, further comprising:
   a history storage unit that stores history of the tone correction performed by the tone correction unit; and
   a determination unit that determines whether or not the tone correction chart is to be printed based on the history stored in the history storage unit, wherein
   the chart print unit prints the tone correction chart when the determination unit determines that the tone correction chart is to be printed, and does not print the tone correction chart but prints the image data when the determination unit determines that the tone correction chart is not to be printed.

5. A non-transitory computer readable medium storing a program causing a computer to execute a process for operating computer, the process comprising:
   storing a plurality of tone correction charts for correcting tone of image data;
   determining characteristics of the image data to be printed based on a saturation histogram of the image data to compare information of the saturation histogram with a predetermined reference value;

selecting a tone correction chart suitable for the image data from the storing based on the determination result including the saturation histogram by the determining;

printing the tone correction chart by the selecting on a sheet;

receiving an adjustment value inputted based on the tone correction chart by the printing;

correcting tone of the image data based the adjustment value by the receiving unit; and printing out the image data after correcting tone of the image data.

* * * * *